United States Patent [19]

Nakamura et al.

[11] Patent Number: 4,650,729
[45] Date of Patent: Mar. 17, 1987

[54] ELECTRIC POWER SOURCE DEVICE

[75] Inventors: Masashi Nakamura, Miura; Yasuo Takagi, Yokohama; Haruki Urakawa, Yokosuka, all of Japan

[73] Assignee: Nissan Motor Co., Ltd., Japan

[21] Appl. No.: 763,605

[22] Filed: Aug. 8, 1985

[30] Foreign Application Priority Data

Aug. 10, 1984 [JP] Japan .................. 59-166426
Aug. 10, 1984 [JP] Japan .................. 59-166427

[51] Int. Cl.⁴ .................. H01M 10/46; H01M 10/50
[52] U.S. Cl. .................. 429/61; 429/62; 429/90; 429/91; 429/120
[58] Field of Search .................. 429/62, 61, 24, 22, 429/120, 26, 90, 91; 320/2, 35, 47

[56] References Cited

U.S. PATENT DOCUMENTS

| | | | |
|---|---|---|---|
| 3,440,109 | 4/1969 | Plattner | 429/62 |
| 3,935,028 | 1/1976 | Strosser et al. | 429/62 X |
| 3,953,239 | 4/1976 | Anderson | 429/120 |
| 4,007,315 | 2/1977 | Brinkmann et al. | 429/62 |
| 4,507,368 | 3/1985 | Hashimoto | 429/62 |

Primary Examiner—Anthony Skapars
Attorney, Agent, or Firm—Lowe, Price, LeBlanc, Becker & Shur

[57] ABSTRACT

An electric power source device comprises a source of electricity in the form of a fuel cell, a battery, a heater or air ventilation arrangement for conditioning electrolyte within the battery, and a circuit for establishing a connection whereby the battery is charged with the source of electricity.

11 Claims, 11 Drawing Figures

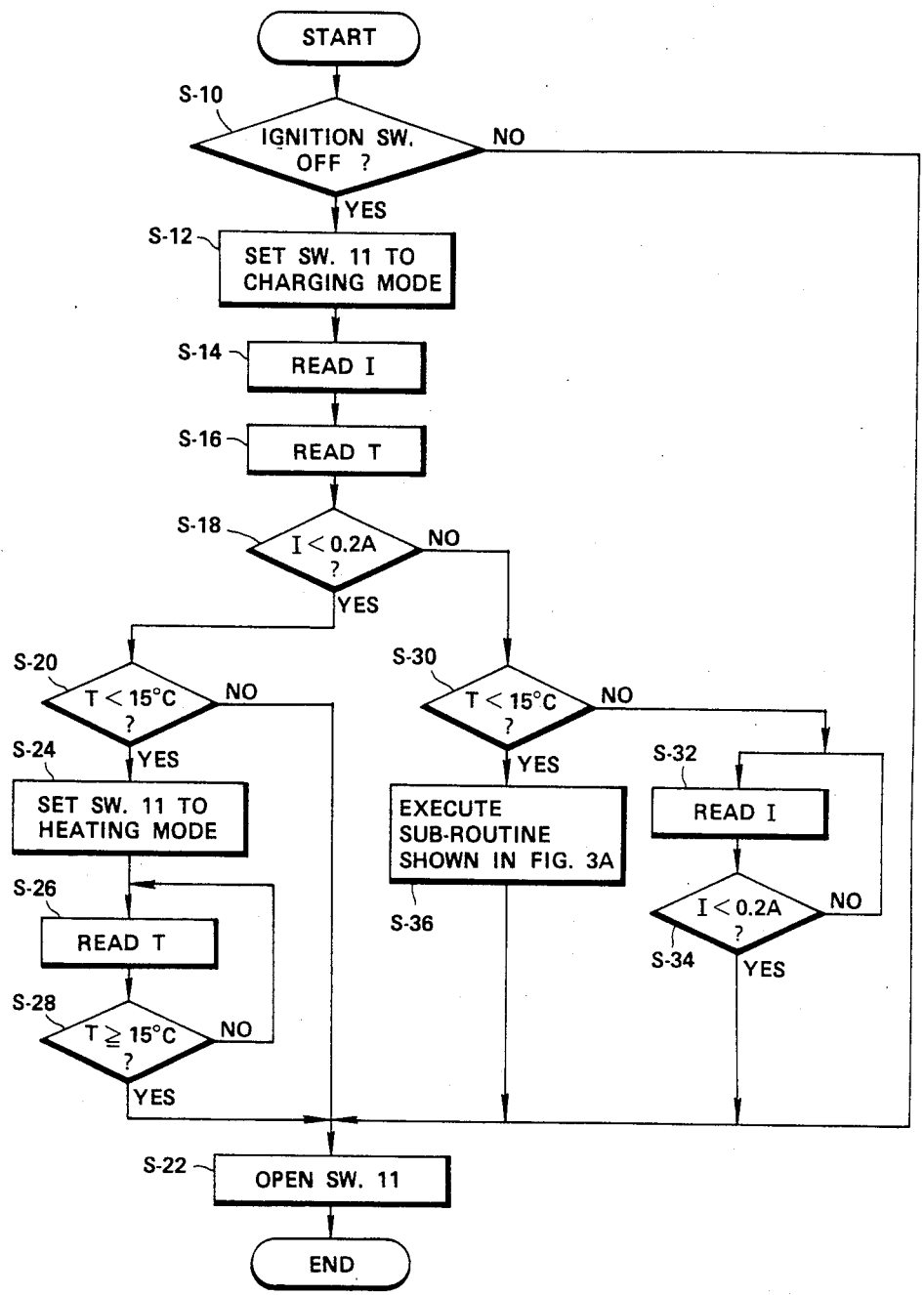

4,650,729

ELECTRIC POWER SOURCE DEVICE

BACKGROUND OF THE INVENTION

The present invention relates to an electric power source device, and more particularly to an electric power source device for use in a motor vehicle, such as an automotive vehicle, for start-up of an engine associated with such a vehicle.

Automotive vehicles employ, as an electric power source device, a battery for start-up of an associated engine. Upon start-up of an engine at very cold temperatures such as when an automotive vehicle is used under arctic weather conditions, it is required that a battery produce a large electric power for maintaining satisfactory start-up performance of the engine. However, there is a limit for a battery to maintain a sufficiently large capacity under very cold temperatures because the battery uses chemical reaction to produce electric energy and thus a drop in temperature causes a drop in capacity of the battery. A drop in capacity of a battery is caused also by an excessively high temperature which is often experienced when an automotive vehicle is left for a long time at a parking lot under strong sun rays during summer season.

The present invention provides an electric power source device which has eliminated the above mentioned problem encountered in the prior art.

SUMMARY OF THE INVENTION

According to the present invention, an electric power source device comprises a battery, a source of electricity, means for conditioning electrolyte within the battery in such a manner as to prevent a drop in capacity of the battery, and means for charging the battery with the source of electricity.

As a source of electricity, a fuel cell is most preferrable because it is least affected by ambient temperature.

According to one embodiment, the electrolyte conditioning means include a heater immersed in the electrolyte and powered by the source of electricity. If desired, the electrolyte conditioning means may include an arrangement that ventilate air stalled around the battery.

Alternatively, the electrolyte conditioning means may include, in the place of a heater power by a source of electricity, a catalytic reactor that facilitates reaction of gases resulting from electrochemical process taking place within a battery when it is being charged, and heat transferring members that serve to conduct heat of reaction from the catalytic reactor to electrolyte within the battery.

BRIEF DESCRIPTION OF THE DRAWINGS

FIG. 3 is a flowchart of a control program stored in a control unit shown in FIG. 2;

DETAILED DESCRIPTION OF EMBODIMENTS

Figure 1:
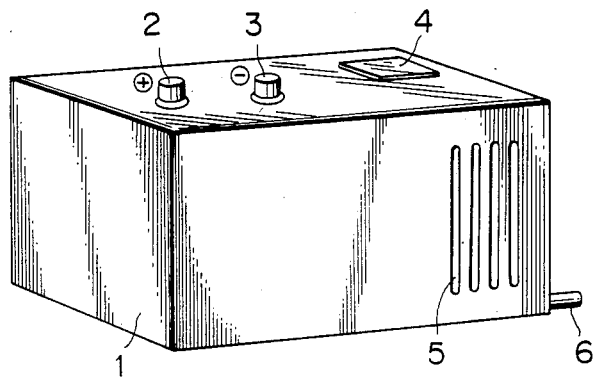
FIG. 1 is a perspective view of a casing housing therein a bettery and a fuel cell which form main parts of a first embodiment of an electric power source device according to the present invention.

Referring to FIG. 1, there is shown a casing 1 having therein a battery and a source of electricity in the form of a fuel cell which constitute main elements of an electric power source device according to the present invention. Extending from the top of the casing 1 are positive and negative terminals 2, 3 of the battery. Reference numeral 4 designates a lid for closing an opening formed through the top of the casing 1 for the purpose of supplying fuel to the fuel cell. Formed through the front wall of the casing 1 as viewed in FIG. 1 are a plurality of slot-like openings 5 via which air is supplied to the fuel cell and for discharging carbon dioxide from the fuel cell. Extending from a portion near the bottom of the side wall of the casing 1 is an exhaust tube 6 for discharging water vapor or water resulting from condensation within the fuel cell.

Figure 2:
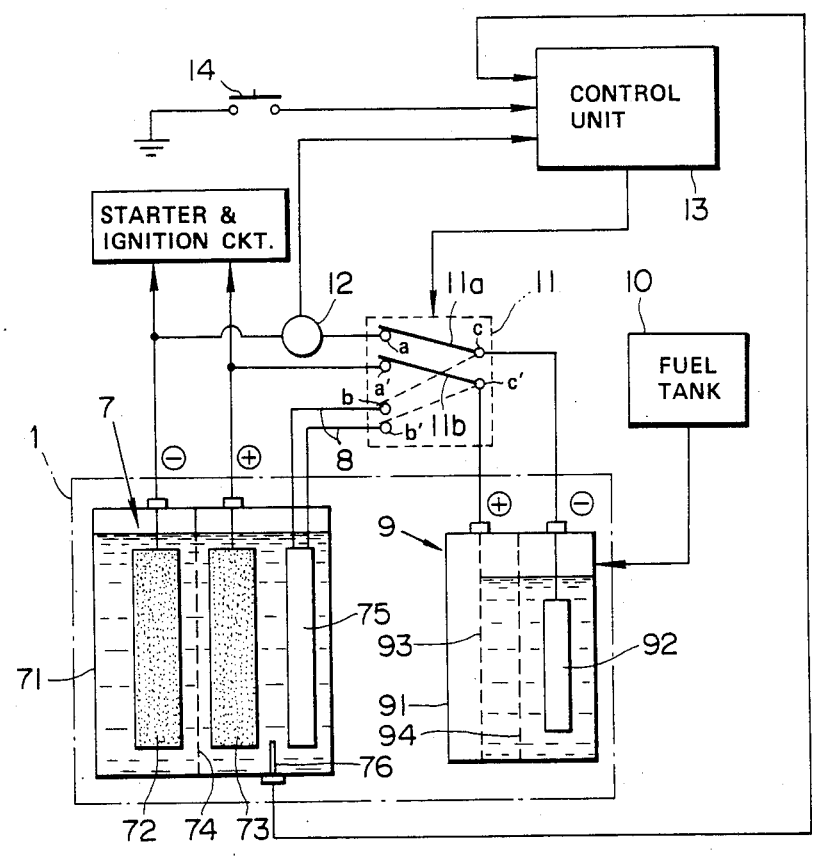
FIG. 2 is a schematic diagram of the first embodiment.

Referring to FIG. 2, the battery and fuel cell mounted within the casing 1 are diagrammatically shown at 7 and 9, respectively, in association with a fuel tank 10, a change-over or mode selection switch 11, a detector in the form of an ammeter 12, a control unit 13, and an ignition switch 14 of an associated engine of an automotive vehicle in which the electric power source device according to the present invention is used. The battery 7 contains within a container 71 electrolyte, such as dilute sulfuric acid. Immersed in the electrolyte are a nagative electrode 72 made of sponge lead, a positive electrode 73 made of lead dioxide and a separator 74 disposed between the two electrodes 72, 73. Also immersed in the electrolyte is a heater 75 made of corrosion resistant carbon. In order to detect temperature of the electrolyte, a temperature sensor in the form of a thermister 76 is provided.

The fuel cell 9 contains within a container 91 thereof electrolytic solution of dilute sulfuric acid and methanol that is used as a fuel. Arranged within the container 91 are a fuel electrode 92 that effects electrochemical oxidation of methanol, an oxygen electrode 93 that effects electrochemical reduction of oxygen within air and a diaphragm 94 disposed between the fuel and oxygen electrodes 92 and 93.

Figures 4A, 4B:
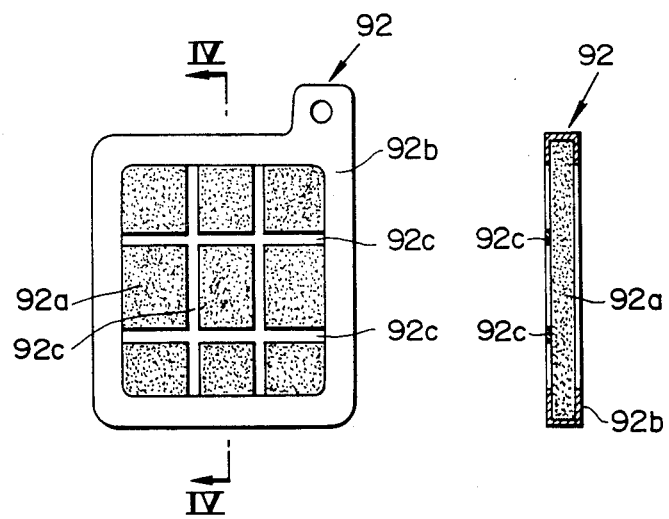
FIG. 4(a) is a plan view of a fuel electrode used in the fuel cell shown in FIG. 2.
FIG. 4(b) is a section taken through line IV—IV of FIG. 4(a)
Figures 5A, 5B:
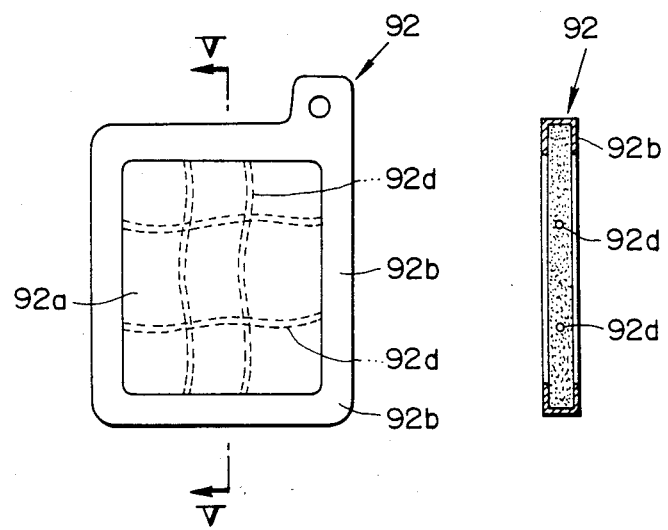
FIG. 5(a) is a similar view to FIG. 4(a) of another example of a fuel electrode.
FIG. 5(b) is a section taken through line V—V of FIG. 5(a)

As shown in FIGS. 4(a) and 4(b), the fuel electrode includes a very thin (0.5 to 1.0 mm in thickness) plate 92a made of graphite. In order to withstand vibrations, the graphite plate 92a has its periphery clamped by a current collecting reinforcement frame 92b, and one side thereof supported by a current collecting network 92c. The current collecting network 92 which serves as means for supporting the graphite plate 92a may be replaced with intersecting wires 92d as shown in FIGS. 5(a) and 5(b). Each of the wires 92d is 0.1 to 0.3 mm in diameter and embedded into graphite plate 92a. Electrically conductive metal is placed on the graphite plate 92a with vapor deposition.

Figure 3A:
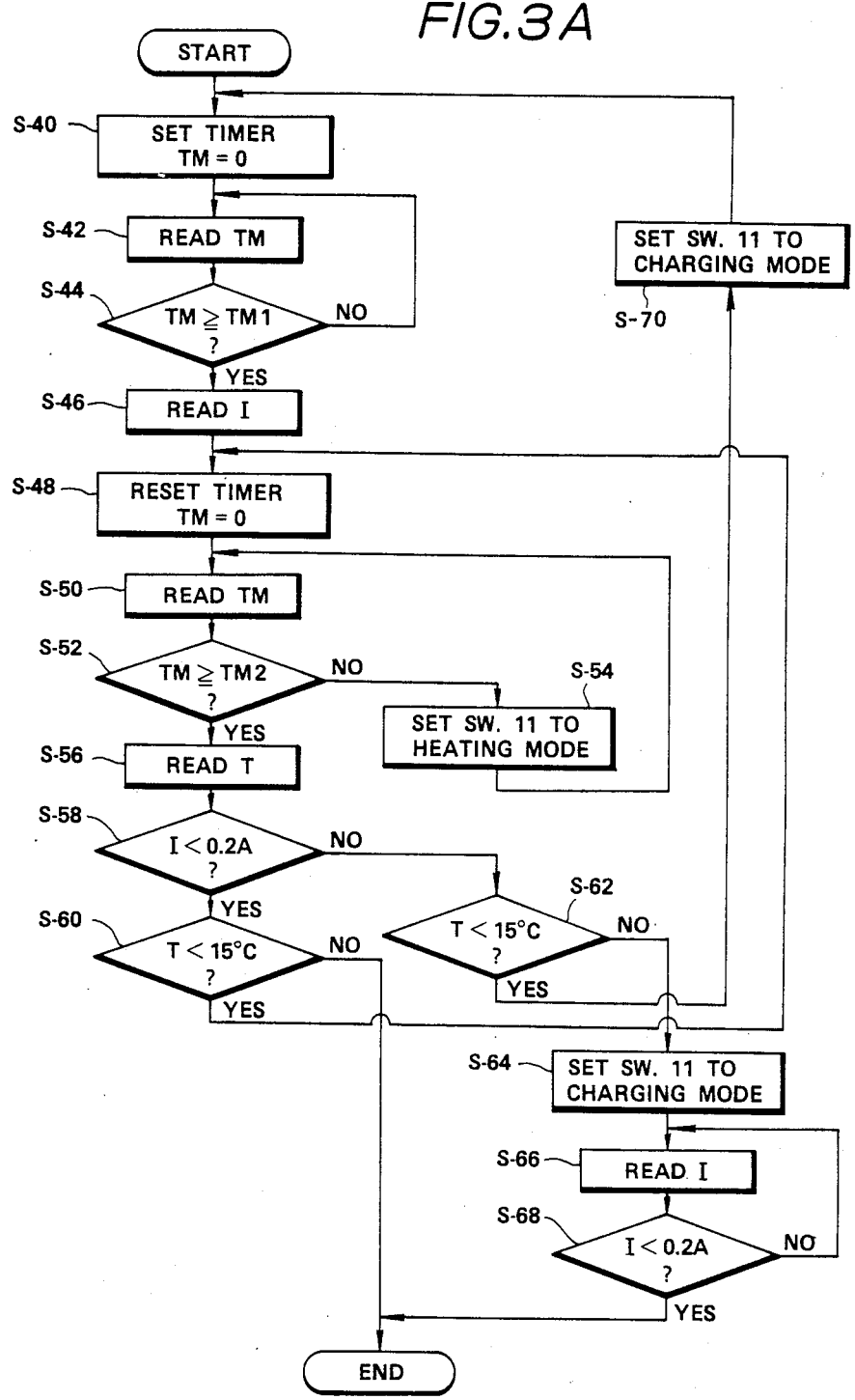
FIG. 3A is a flowchart of a sub-routine.

Referring back to FIG. 2, the fuel tank 10 contains methanol to be supplied to the fuel cell 9. The change-over switch 11 includes a pair of swingable contact bars 11a and 11b and three pairs of contacts a, a', b, b' and c, c'. The contacts a, a' are electrically connected to the negative and positive electrodes 72 and 73, respectively of the battery 7. The contacts b, b' are electrically connected via wires 8, 8 with the heater 75. The contacts c, c' are electrically connected with the fuel and oxygen electrodes 92 and 93, respectively of the fuel cell 9. The contact bars 11a and 11b are swingable about the contacts c, c' to a charging mode position as illustrated by the solid line wherein the contacts a, a' are electrically connected with the contacts c, c', respectively, or a heating mode position as shown by the broken line wherein the contacts b, b' are electrically connected with the contacts c, c', respectively, or an open position, not shown. wherein neither contacts a, a' nor contacts b, b' are electrically connected with contacts c, c'. When the change-over switch 11 assumes the charging mode position, the negative and positive electrodes 72 and 73 are electrically connected with the fuel and oxygen electrodes 92 and 93 so that current is allowed to pass to the battery 7 to charge same. Since the intensity of current measured by the ammeter 12 decreases as the charging of the battery progresses, an output of the ammeter 12 indicative of the measured intensity of current is indicative of the degree to which the battery 7 has been charged. The output of the ammeter 12 is supplied to the control unit 13. When the change-over switch 11 assumes the heating mode position, current is supplied to the heater 75 so that the heater 75 raises temperature of the electrolyte within the container 71 of the battery 7. This temperature is measured by the temperature sensor 76 and an output of the temperature sensor 76 indicative of the measured temperature is supplied to the control unit 13. The ignition switch 14 is turned off when an associated engine ignition key is turned to a predetermined position, i.e., an "OFF" position thereof, where the battery electrodes 72 and 73 are disconnected from an associated starter motor circuit and an associated ignition circuit. An ON/OFF type output of the ignition switch 14 is aupplied to the control unit 13. The control unit 13 is a microcomputer based controller which includes, as usual, an input/output interface, a random access memory (RAM), a read only memory (ROM) and a central processing unit (CPU). The above mentioned output signals supplied to the control unit 13 are converted into digital signals before being processed in the CPU. The ROM stores a control program which will be described in connection with flowchart shown in FIG. 3. The control unit 13 generates a control signal with which the change-over switch 11 assumes one of the three positions, i.e., charging mode position, heating mode position and off position. Referring to FIGS. 3 and 3A, and more particularly to FIG. 3, when the ignition switch 14 is turned OFF and the associated engine stops, the control unit 13 generates a command signal by which the change-over switch 11 is set to charging mode where the fuel-side contacts c, c' are connected with the battery electrode side contacts a, a' (see steps S-10 and S-12). As a result, the battery 7 becomes a load of the fuel cell 9 so that the fuel cell 9 starts generating electric current, thus charging the battery 7. The intensity of charging current I measured by the ammeter 12 is read in step S-14 and temperature of electrolyte of the battery 9 measured by the temperature sensor 76 is read in step S-16. The degree to which the battery 7 has been charged is detected by the ammeter 12 although it may be detected otherwise. After executing these steps, step S-18 is executed where decision is made whether or not the intensity of charging current I obtained in step S-14 is less than a predetermined value, such as 0.2 A(ampere). When the intensity of charging current I is less than 0.2 A, the control unit 13 recognizes that the battery 7 has been charged sufficiently and executes step S-20 where decision is made whether or not the electrolyte temperature T is less than a predetermined value of 15° C. When the temperature T is not less than 15° C., step S-22 is executed where the control unit 13 generates a command signal by which the change-over switch 11 is set to open position where the fuel cell side contacts c, c' are disconnected from both the battery electrode side contacts a, a' and the heater side contacts b, b'. When the decision in step S-20 results in YES, setp S-24 is executed where the control unit 13 generates a command signal by which the change-over switch 11 is set to heating mode position where the fuel cell side contacts c, c' are connected with the heater side contacts b, b'. This causes current to pass through the heater 75, thus heating the electrolyte of the battery 7. As a result, the electrolyte temperature T starts rising. The rise in temperature T is monitored in steps S-26 and S-28. After the electrolyte temperature T has increased and becomes equal to or above a predetermined temperature value of 15° C., the decision in step S-28 results in YES and the change-over switch 11 is opened in step S-22.

When the decision in step S-18 results in NO and the degree to which the battery 7 is charged is not sufficient, the control goes to step S-30 where decision is made whether or not the electrolyte temperature T is less than a predetermined value of 15° C. When the electrolyte temperature T exceeds 15° C. and thus sifficiently high although the degree to which the battery 7 is charged is not sufficiently high, steps S-32 and S-34 are executed where the charging current I is read and compared with the predetermined value of 0.2 A to determine whether the battery 7 is charged to the sufficiently high degree. Thus, the charging mode of the change-over switch 11 which was set in step S-12 is maintained until the charging current I becomes less than 0.2 A. After the charging current I has become less than 0.2 A (step S-34), the change-over switch 11 is opened in step S-22, thus terminating the charging mode operation. When the decision in step S-30 results in YES, which means that the degree to which the battery 7 is charged is insufficient and at the same time, the electrolyte temperature is low, the control goes to step S-36 where sub-routine shown in FIG. 3A is executed. What is intended in this sub-routine is to set the change-over switch 11 to charging mode position or heating mode position alternatively until the battery 7 is charged sufficiently and the electrolyte temperature is elevated sufficiently. Altenatively, it is possible to maintain heating mode until the electrolyte temperature is elevated sufficiently and then charging mode is set to charge the battery to sufficiently high degree.

Referring to FIG. 3A, a timer value TM of a timer is set to 0 (zero) in step S-40, causing the timer to start counting. Then, the time value TM is read in step S-42 and compared with a predetermined period of time TM1 in step S-44. When the timer value TM is less than TM1, the control goes back to step S-42, and executiuon of the steps S-42 and S-44 is repeated until the decision in step S-44 results in YES when the timer value TM is equal to or greater than TM1. Thus, the charging mode position of the change-over switch 11 which was set in step S-10 is maintained for the predetermined period of time TM1. Upon lapse of the predetermined period of time TM1, the charging current I is read in step S-45, and the timer value TM is reset to 0 (zero) in step S-48. Then, the timer value TM is read in step S-50 and compared with a predetermined period of time TM2 in step S-52. Since, initially, the timer value TM is less than TM2, the control goes from step S-52 to step S-54 where the change-over switch 11 is set to heating mode position before going back to step S-50. Execution of these steps S-50, S-52 and S-54 is repeated until the timer value TM becomes equal to or exceeds TM2. Thus, the heating mode of the switch 11 is maintained for the predetermined period of time TM2. Upon lapse of the predetermined period of time TM2, the electrolyte temperature T is read in step S-56. After completing one cycle including charging mode operation for the period of time TM1 which is followed by heating mode operation for the period of time TM2, decision is made in step S-58 whether or not the charging current I obtained in step S-46 is less than the predetermined value of 0.2 A. When the decision in step S-58 is YES, step S-60 is executed where the electrolyte temperature T obtained in step S-56 is compared with the predetermined value of 15° C. When the temperature T is greater than 15° C., the subroutine shown in FIG. 3A is terminated and the control goes to step S-22 (shown in FIG. 3) where the change-over switch 11 is opened. When decision in step S-60 results in YES, i.e., the temperature T is still low and is to be elevated, the control goes to step S-48 to repeat execution of the following steps S-52, S-54 and S-56 where the change-over switch 11 is set to heating mode position again for the predetermined period of time TM2. When the decision of step S-58 results in NO, decision is made in step S-62 whether or not the temperature T obtained in step S-56 is less than the predetermined value of 15° C. When the decision in step S-62 results in NO, i.e., the battery needs to be charged although the electrolyte temperature is high enough, the change-over switch 11 is set to charging mode position in step S-64 and the charging mode operation is maintained until the charging current I obtained in step S-66 becomes less than the predetermined value of 0.2 A (see step S-68). When the decision in step S-68 becomes less than 0.2 A, the subroutine shown in FIG. 3A is terminated and the change-over switch 11 is opened in step S-22 (see FIG. 3). When the decision in step S-62 results in YES, i.e., the battery needs to be charged and the electrolyte temperature needs to be elevated, the control goes to step S-70 where the change-over switch 11 is set to charging mode position and then execution of step S-40 and its following steps is repeated to charge the battery 7 for the predetermined period of time TM1 and then heat the electrolyte of the battery 7 for the predetermined period of time TM2.

When the engine key is inserted to start the associated engine, turning of the ignition key to ON position causes immediate opening of the change-over switch 11 to forcibly terminate charging mode or heating mode operation.

Figure 6:
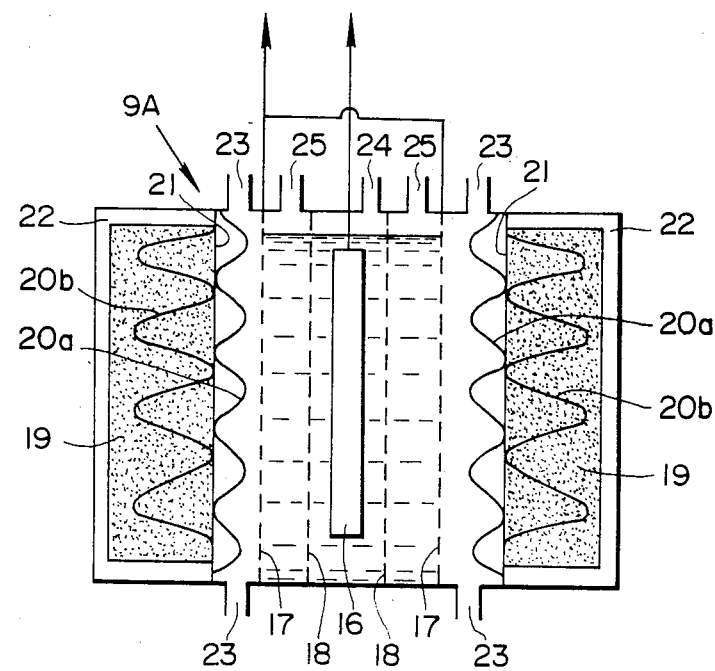
FIG. 6 is a diagrammatic sectional view of a modification of a fuel cell which may replace the fuel cell shown in FIG. 2.

As will be understood from the preceding description, as a result of controlling charging of the battery and heating of the electrolyte of the battery in response to detection of the degree to which the battery is charged and the temperature of electrolyte, the electric power source device according to this embodiment shows satisfactorily high start-up performance. Referring to FIG. 6, a modification of a fuel cell 9A is described. The fuel cell 9A includes a container 15 which contains electrolytic solution. Arranged in the center of the container 15 as being immersed in the electrolytic solution is a fuel electrode 16. Oxygen electrodes 17, 17 are arranged around the fuel electrode 16 with ion exchange membrances 18, 18 disposed between the fuel electrode 16 and the oxygen electrodes 17, 17. Mounted within the container 15 and arranged between the oxygen electrodes 17, 17 and the adjacent peripheral wall of the container 15 is heat reserving material 19 such as hydroxide or sodium thiosulfate. In order to shield heat radiation from the heat reserving material 19, heat insulating material 22 is positioned between the heat reserving material 19 and the adjacent peripheral wall of the container 15. A metal plate wall 21 made of corrosion resistant material such as SUS defines inner boundary of the heat reserving material 19. Heat exchange fins are provided, some of which are embedded and extend through the heat reserving material 19 and the other projecting into passages via which air having entered thereinto through air intake ports 23 passes. Such heat exchanger fins 20a, 20b are made of the same material as that the metal plate wall 21 is made of. The provision of the metal plate wall 21 and heat exchange fins 20a, 20b is to provide better heat transfer to the heat reserving material 19. The ports 23 are used for admitting air and also for discharging gas produced. The reference numeral 24 designates an exhaust port for discharging carbon dioxide produced around the fuel electrode 16, and the reference numerals 25, 25 designate exhaust ports for discharging water or unconverted nitrogen gas resulting from reaction taking place in the container 15.

With the arrangement of the heat reserving material 19, metal plate wall 21 and heat exchanger fins 20a, 20b, heat of reaction taking place within the fuel cell 9A is reserved within the heat reserving material 19 via the heat exchanger fins 20a, 20b and metal plate wall 21. On start-up of the fuel cell 9A, air is heated by contact with the heat exchanger fins 20a owing to the heat reserved in the heat reserving material 19 before reaching the oxygen electrodes 17, thus enhancing start-up performance of the fuel cell 9A.

Although, in the first embodiment, the problem of a drop in battery capacity due to low temperature has been dealt with, the battery capacity is subject to a considerable drop when the temperature around a battery exceeds 35° C. One effective measure to cope with this drop in battery capacity owing to high temperature is described hereinafter in connection with FIG. 7.

Figure 7:
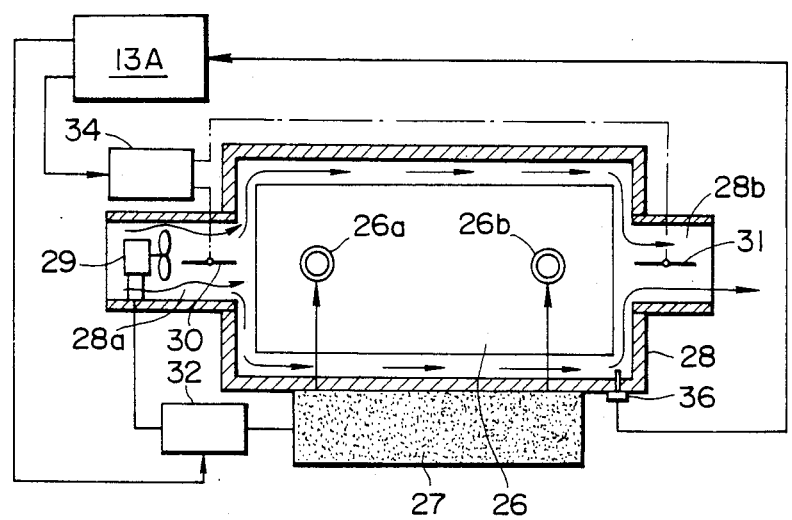
FIG. 7 is a diagrammatic top plan view, partly in section, of a second embodiment of an electric power source device.

Referring to FIG. 7, a cooling or ventilating arrangement which is effective in reducing a drop in battery capacity due to high temperature is shown.

FIG. 7 is a top plan diagrammatic view with its upper portion of a casing 28 removed to show a battery 26 arranged within the casing 28. Reference numerals 26a and 26b designate battery terminals in associattion with a fuel cell 27. Although not shown in this Figure, the operative association of the battery 26 with the fuel cell 27 is the same as that of the battery 7 with the fuel cell 9 (see FIG. 2). In order to allow cooling air to pass around the battery 26, walls of the casing 28 are spaced from the battery 26. Air inlet port 28a and air outlet port 28b are formed at the opposite end walls of the casing 28. Disposed within the air inlet port 28a is an electric fan 29 to forcibly admit relatively cool outside air into the casing 28 to flow around the battery 26 toward the air outlet port 28b. Disposed within the air inlet port 28a downstream of the electric fan 29 is a valve 30 for closing the air inlet port 28a. Disposed within the air outlet port 28b is a valve 31 for closing the air outlet port 28b. The electric fan 29 is electrically connectable with the fuel cell 27 via a switch 32. The valves 30 and 31 are closed or opened by a valve actuator 34. The reference numeral 36 designates a temperature sensor provided to measure temperature of air within the casing 28 at a portion near the battery 26. An output of the temperature sensor 36 indicative of the measured temperature is supplied to a control unit 13A. Outputs from the control unit 13A are supplied to the switch 32 and also to the valve actuator 34. The control unit 13A is substantially the same as the control unit 13 shown in FIG. 2 except the above described connection with the temperature sensor 36, with the switch 32 and with the valve actuator 34. For simplicity of illustration, the operative association of the control unit 13A with the battery 26 and the fuel cell 27 via a change-over or mode selection switch (equivalent to the change-over switch 11 shown in FIG. 2) is not illustrated.

The operation is briefly described assuming that the device shown in FIG. 7 is mounted within an engine compartment of an automotive vehicle.

Normally, the valves 30 and 31 are opened as illustrated in FIG. 7 and electric fan switch 32 is opened and thus the electric fan 29 is not in operation. When the automotive vehicle is left for a long time in a location that is exposed to strong sun rays during a season when outside temperature is high such as during summer, temperature within the engine compartment rapidly increases and causes a considerable self-discharge to take place within the battery 26 which leads to a considerable drop in battery capacity. In order to cope with this problem, when the temperature measured by the temperature sensor exceeds a predetermined value of 35° C., the control unit 13A closes the electric fan switch 32 to activate the electric fan 29 by the fuel cell 27. Then, relatively cool outside air is admitted into the casing 28 via the air inlet port 28a for ventilation, thus suppressing excessive rise in temperature around the battery 26. As a result, self-discharge taking place within the battery 26 is suppressed owing to forced ventilation by air admitted by the electric fan 29.

When the outside temperature is very low such as during winter, the control unit 13A has the valve actuator 34 to close the valves 30 and 31 to isolate the air around the battery 26 from the outside air to form heat insulating air layer on receiving output from the temperature sensor 36 indicative of temperature lower than a second predetermined value which is set lower than the first mentioned predetermined value of 35° C. Owing to the air layer which serves as a heat insulating material, a drop in temperature of the battery 26 is suppressed, thus effectively preventing a drop in battery capacity.

Figure 8:
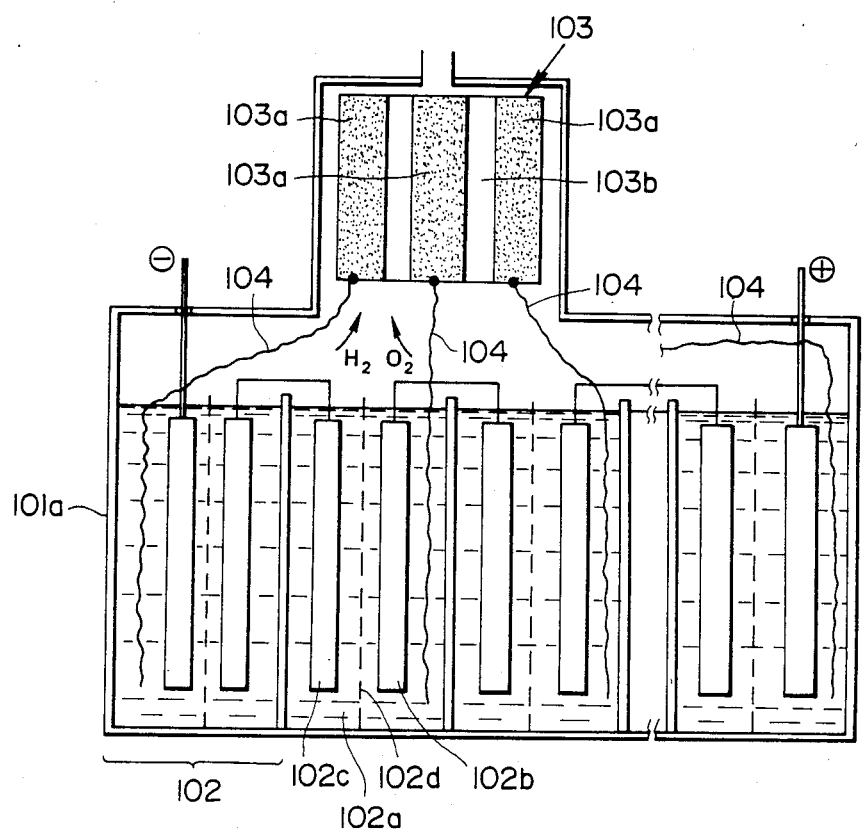
FIG. 8 is a modification of a battery which may replace the battery shown in FIG. 2.

Referring lastly to FIG. 8, a modification of a battery 7A is described. This modified battery is different from the battery 7 shown in FIG. 2 in that instead of the heater 75 powered by the fuel cell 9, a catalytic reactor 103 is used which generates heat on performing catalytic reaction of hydrogen and oxygen into water and a heat transferring member 104 to transfer the heat to electrolyte of each of serially connected unit cells 102 arranged within a container 101a of the battery. The battery 7A is made of a plurality of the unit cells 102, each has a positive electrode plate 102b made of lead dioxide and a negative electrode plate 102c made of sponge lead as separated by a separator 102d which are all immersed in electrolyte 102a such as dilute sulfuric acid. The catalytic reactor 103 is disposed within the container 101a over all of the unit cells 102 and comprises an electrically insulating carrier 103b including a plurality of portions 103a which catalyst is adhered to. Such portions 103a are electrically insulated from each other. Each of such portions 103a is associated with one of the unit cells 102 via heat transferring member 104 that is made of carbon fiber that has high heat conduction and high corrosive resistance.

The battery 7A is selectively connected with a fuel cell via a change-over switch under the control of a control unit. The change-over switch which may be used here is different from the change-over switch 11 shown in FIG. 2 in that heater side contacts b, b' are not used because a heater powered by electric current supplied by the fuel cell is not used in the battery 7A. The control strategy which may be employed here is quite simple as compared to that employed in the embodiment shown in FIG. 2 and described in connection with FIGS. 3 and 3A because the heating mode operation control which is necessary in the control shown in FIGS. 3 and 3A is not necessary. Besides, the temperature sensor 76 is not necessary in the electric power source device using the battery 7A.

Assume now that the battery 7A is charged by the associated fuel cell under a condition where the temperature of electrolyte of the battery 7A is very low, electrolysis of the electrolyte is caused upon completion of charging of the battery 7A to a level corresponding to capacity of the battery 7A which has been dropped due to the low temperature, allowing the production of oxygen gas from the positive electrodes 102b and hydrogen gas from the negative electrodes 102c at the rate of 1:2.

The oxygen gas and hydrogen gas produced within the container 101a react with each other on contacting with the catalyst adhered to portions 103a, thus producing heat. The heat of reaction is transferred via the heat transferring members 104 to electrolyte 102a of the unit cells 102, elevating temperature of the electrolyte 102a. Elevation of temperature of the battery causes restoration of battery capacity, finishing the electrolysis. This allows charging to start again. Owing to the elevation of the temperature of electrolyte 102a, restoration of battery capacity is considerably remarkable.

Since the portions 102 to which catalyst is adhered are insulated by the electrically insulating carrier 103b, unit cells 102 are electrically insulated.

Since electrolyte is heated on charging the battery, the charging of the battery is carried out effectively regardless of how cold ambient temperature may be.

What is claimed is:

1. An electric power source device for a motor vehicle having an ignition switch having an off position, comprising:
a casing;
a battery with electrolyte;
a source of electricity;
said battery and said source of electricity being included by said casing;
means for conditioning said electrolyte of said battery in such a manner as to prevent a drop in capacity of said battery which might otherwise be caused by ambient temperature where said battery is disposed;

connecting means for connecting said source of electricity to said battery to charge said battery, said connecting means including a change-over switch means having a charging mode position for connecting said source of electricity to said battery to charge said battery; and controlling means for controlling said change-over switch means in such a manner for disconnecting said source of electricity from said battery when the ignition switch is turned on.

2. An electric power source device as claimed in claim 1, wherein said source of electricity comprises a fuel cell.

3. An electric power source device as claimed in claim 1, wherein said electrolyte conditioning means includes a heater which is immersed in said electrolyte and electrically connectable with said source of electricity to heat said electrolyte when electric current is supplied thereto from said source of electricity, and a temperature sensor means for measuring temperature of said electrolyte and generating a temperature indicative output signal indicative of said measured temperature, and wherein said change-over switch means has a heating mode position for connecting said heater to said source of electricity, and said controlling means is operable in response to said temperature indicative output signal to control said change-over switch means in such a manner as to maintain the temperature of said electrolyte above a predetermined value.

4. An electric power source device as claimed in claim 3, wherein said connecting means includes means for measuring intensity of charging current supplied to said battery and generating a current indicative output signal, and wherein said controlling means is operable in response to said current indication signal to control said change-over switch means for reducing the intensity of said charging current below a predetermined value.

5. An electric power source device as claimed in claim 2, wherein said fuel cell includes a container means including heat reserving material mounted within said container for reserving heat of reaction taking place within said fuel cell and means for heating intake air admitted to said fuel cell with the heat reserved by said heat reserving means.

6. An electric power source device as claimed in claim 1, wherein said electrolyte conditioning means includes a casing having arranged therein said battery in such a manner as to define an air layer around said battery, said casing having end walls formed with air inlet and an air outlet port which are open to said air layer, valve means for closing said air inlet and air outlet ports so as to isolate said air layer from ambient air, and means for ventilating said air layer.

7. An electric power source device as claimed in claim 1, wherein said battery includes a container having said electrolyte therein and a catalytic reactor mounted on said container in communication with said electrolyte and means for transferring heat from said catalytic reactor to said electrolyte.

8. An electric power source device as claimed in claim 7, wherein said transferring means includes carbon fibers.

9. An electric power source device as claimed in claim 2, wherein said fuel cell has a fuel electrode that includes a frame, a graphite plate having its periphery clamped by said frame, and means for supporting said graphite plate.

10. An electric power source device as claimed in claim 9, wherein said supporting means includes a current collecting network.

11. An electric power source device as claimed in claim 9, wherein said supporting means includes electrically conductive metal wires embedded into said graphite plate.

* * * * *